(12) United States Patent
Risheq

(10) Patent No.: US 7,019,871 B2
(45) Date of Patent: Mar. 28, 2006

(54) DIGITAL PHOTO ALBUM HAVING A BUILT-IN SCANNER

(75) Inventor: Tareq A. Risheq, Laguna Niguel, CA (US)

(73) Assignee: TR Marketing, Inc., Laguna Niguel, CA (US)

( * ) Notice: Subject to any disclaimer, the term of this patent is extended or adjusted under 35 U.S.C. 154(b) by 221 days.

(21) Appl. No.: 10/410,701

(22) Filed: Apr. 8, 2003

(65) Prior Publication Data

US 2004/0201778 A1 Oct. 14, 2004

(51) Int. Cl.
*H04N 1/04* (2006.01)

(52) U.S. Cl. ............... 358/474; 358/474; 358/505; 345/156; 348/187

(58) Field of Classification Search ............... 358/474, 358/505, 405, 1.15, 488; 345/156, 788; 348/187
See application file for complete search history.

(56) References Cited

U.S. PATENT DOCUMENTS

| | | | | |
|---|---|---|---|---|
| 4,888,648 | A * | 12/1989 | Takeuchi et al. ............... 386/52 |
| 5,574,519 | A | 11/1996 | Manico et al. | |
| 5,703,624 | A | 12/1997 | Van Kruistum | |
| 5,761,485 | A | 6/1998 | Munyan | |
| 5,812,899 | A | 9/1998 | McIntyre | |
| 6,101,292 | A | 8/2000 | Udagawa et al. | |
| 6,111,586 | A | 8/2000 | Ikeda et al. | |
| 6,123,362 | A | 9/2000 | Squilla et al. | |
| 6,141,052 | A | 10/2000 | Fukumitsu et al. | |
| 6,229,566 | B1 | 5/2001 | Matsumoto et al. | |
| 6,249,644 | B1 | 6/2001 | Inoue et al. | |
| 6,324,545 | B1 | 11/2001 | Morag | |
| 6,396,472 | B1 | 5/2002 | Jacklin | |
| 6,434,579 | B1 | 8/2002 | Shaffer et al. | |
| 6,441,828 | B1 | 8/2002 | Oba et al. | |
| 6,715,003 | B1 | 3/2004 | Safai | |
| 6,738,154 | B1 | 5/2004 | Venable | |
| 6,745,186 | B1 | 6/2004 | Testa et al. | |
| 6,778,935 | B1 * | 8/2004 | Maeda et al. ............... 702/127 |
| 6,809,762 | B1 | 10/2004 | Donnelly | |
| 6,816,620 | B1 | 11/2004 | Enomoto et al. | |
| 6,833,848 | B1 | 12/2004 | Wolff et al. | |
| 2002/0122067 | A1 * | 9/2002 | Geigel et al. ............... 345/788 |
| 2002/0156827 | A1 * | 10/2002 | Lazar ............... 709/201 |
| 2003/0090457 | A1 * | 5/2003 | Hong ............... 345/156 |
| 2003/0090498 | A1 | 5/2003 | Shick et al. | |
| 2003/0214509 | A1 | 11/2003 | Gotfried | |
| 2004/0027590 | A1 | 2/2004 | Silverbrook et al. | |
| 2004/0095481 | A1 | 5/2004 | Silverbrook et al. | |

* cited by examiner

*Primary Examiner*—Kimberly Williams
*Assistant Examiner*—Negussie Worku
(74) *Attorney, Agent, or Firm*—Fish & Neave IP Group Ropes & Gray LLP; Mark D. Rowland; Chi-Hsin Chang

(57) ABSTRACT

The present invention relates to a digital photo album having a hard drive and built-in scanner configured to scan photographic prints. The digital photo album allows a user to save the photographic prints as digital images on the hard drive, or another medium, and then view individual images or play photo album slideshows comprising a plurality of digital images. Additionally, a user may upload digital images from an external medium to the hard drive of the photo album, and then view those images and/or include them in a playlist. The digital photo album of the present invention advantageously allows a user to scan photographic prints, upload or download digital images, and view digital images individually or in an album format, in a substantially automated manner and without the need for complex peripheral devices.

90 Claims, 14 Drawing Sheets

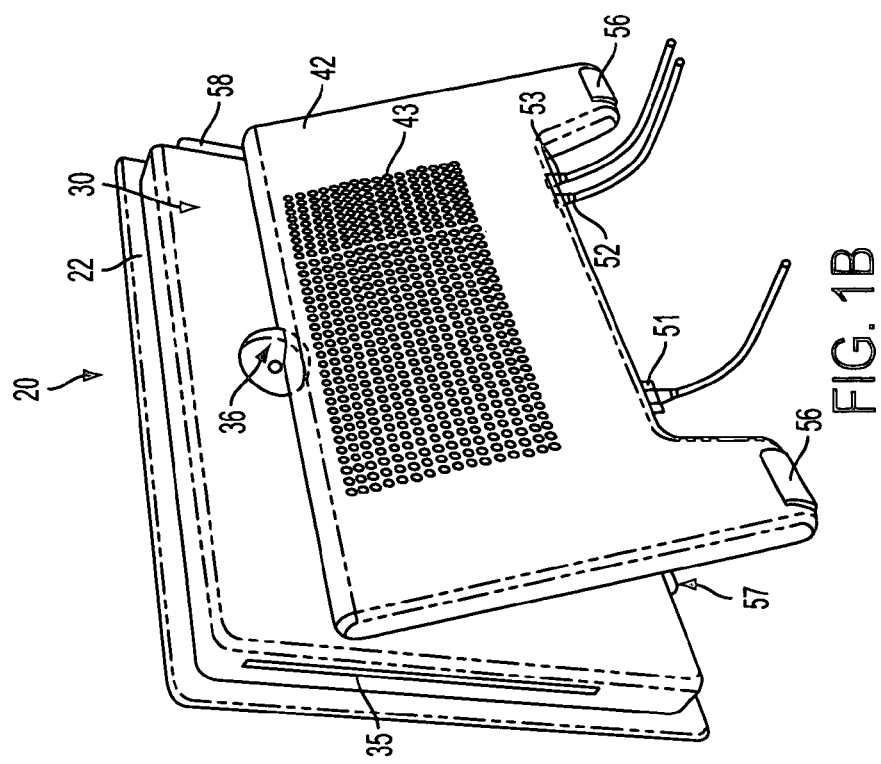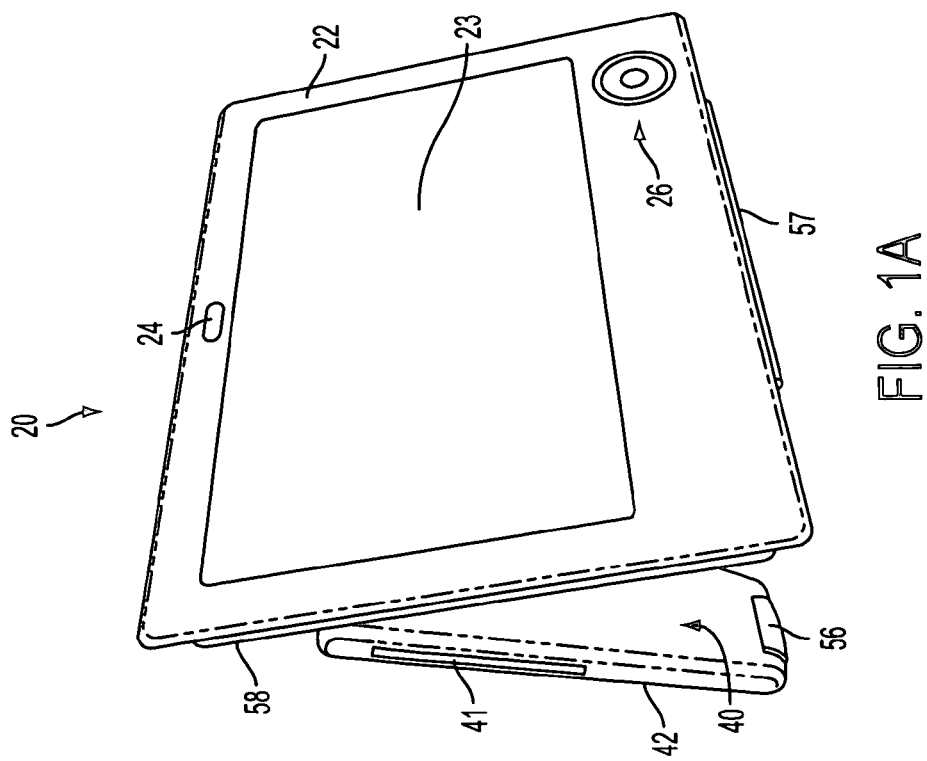

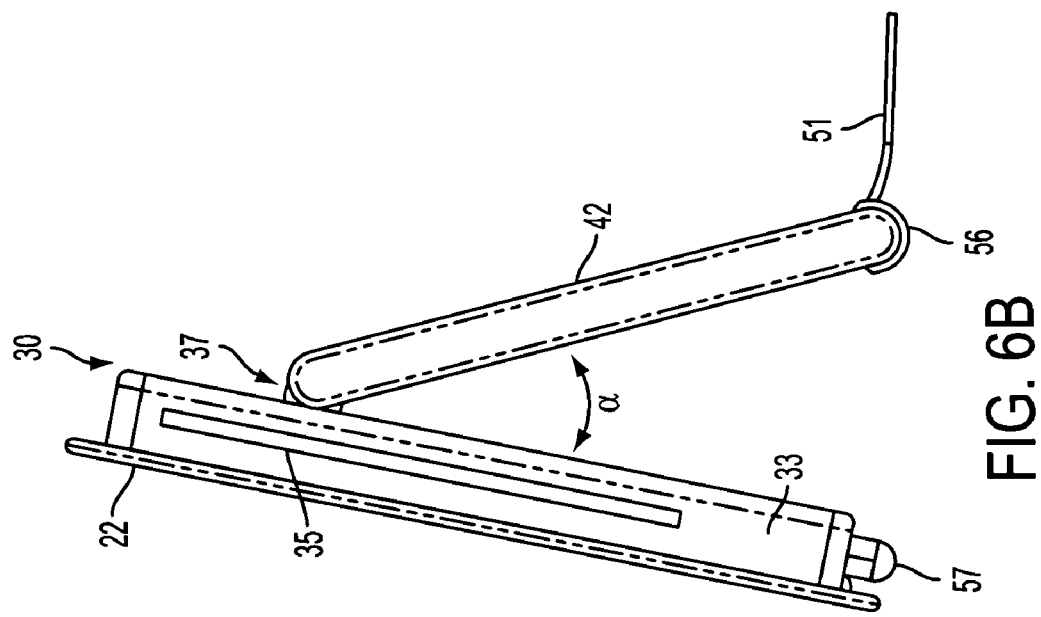
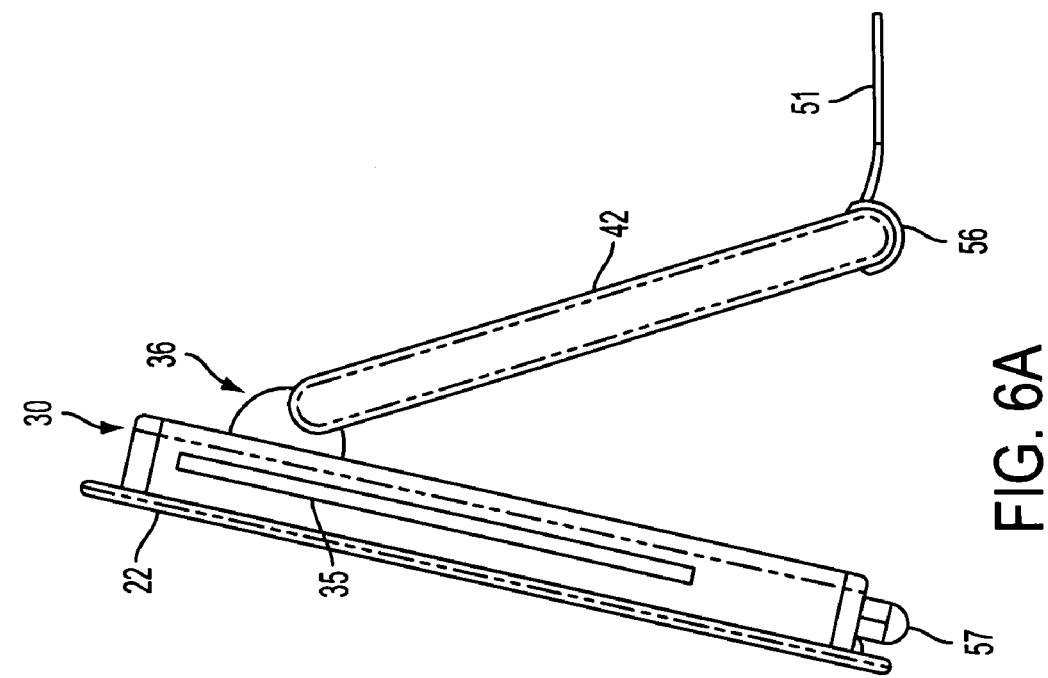

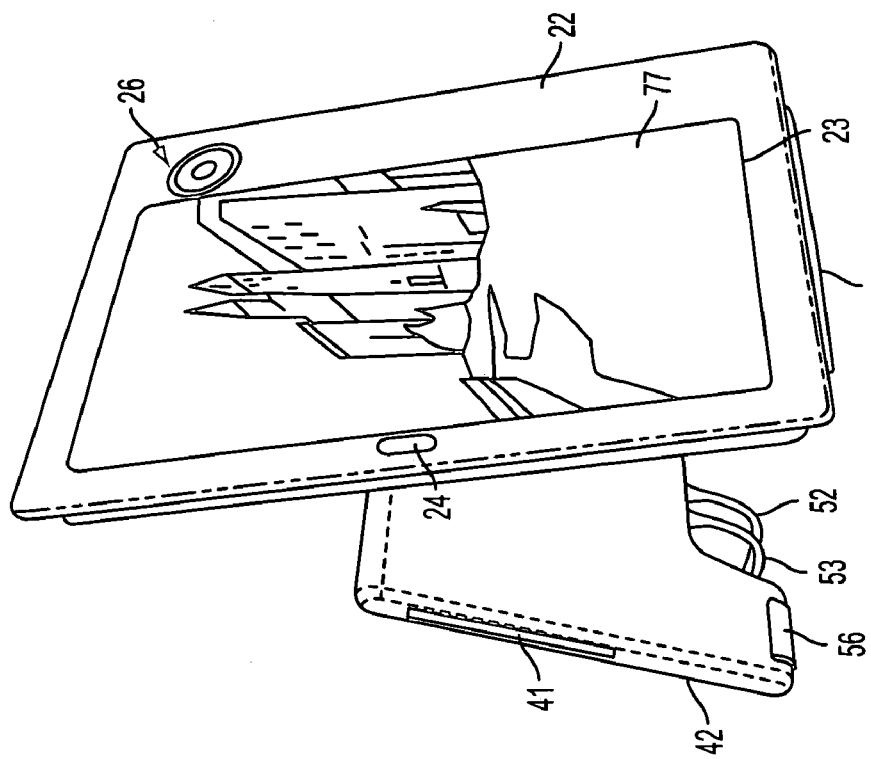
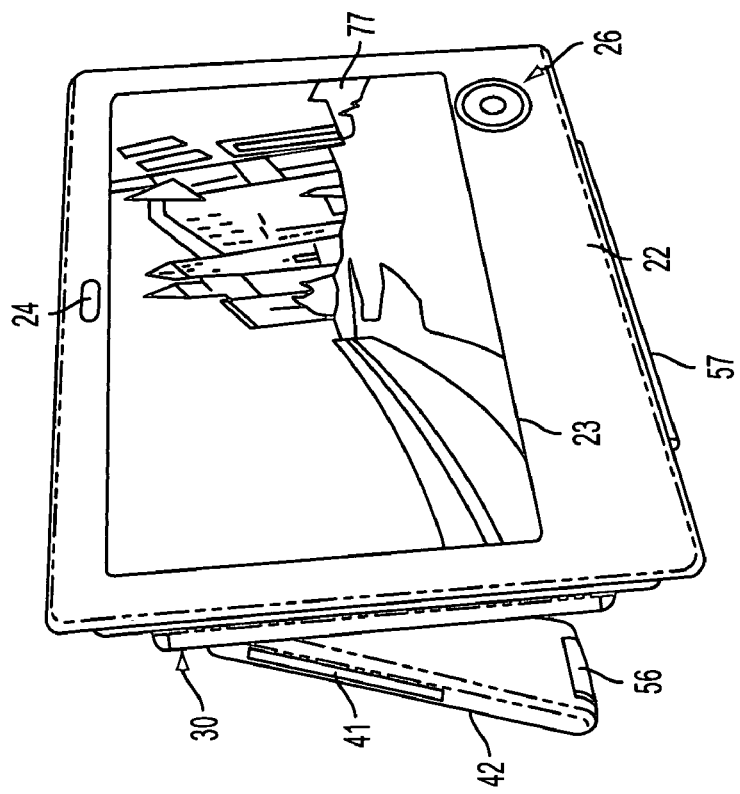

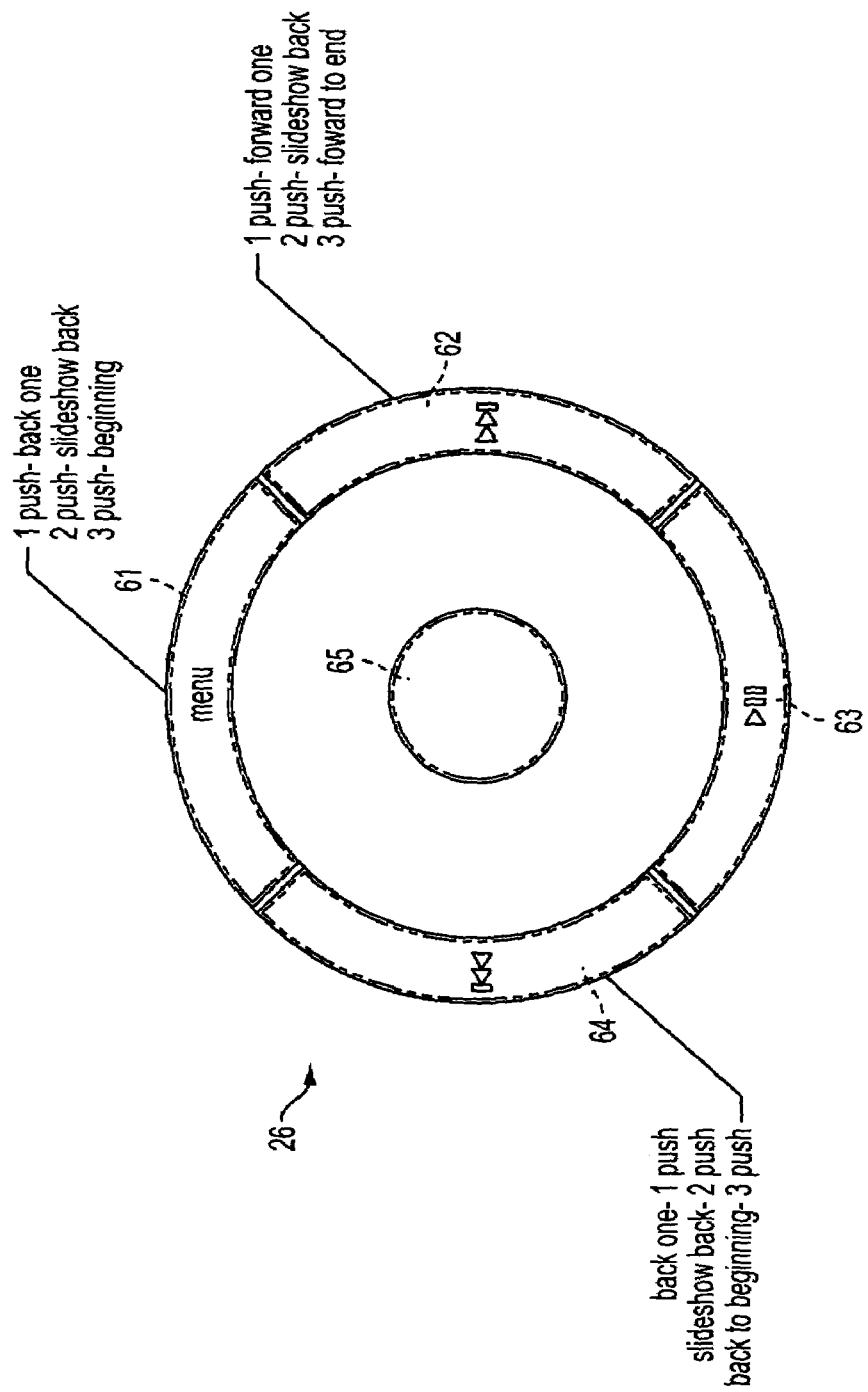

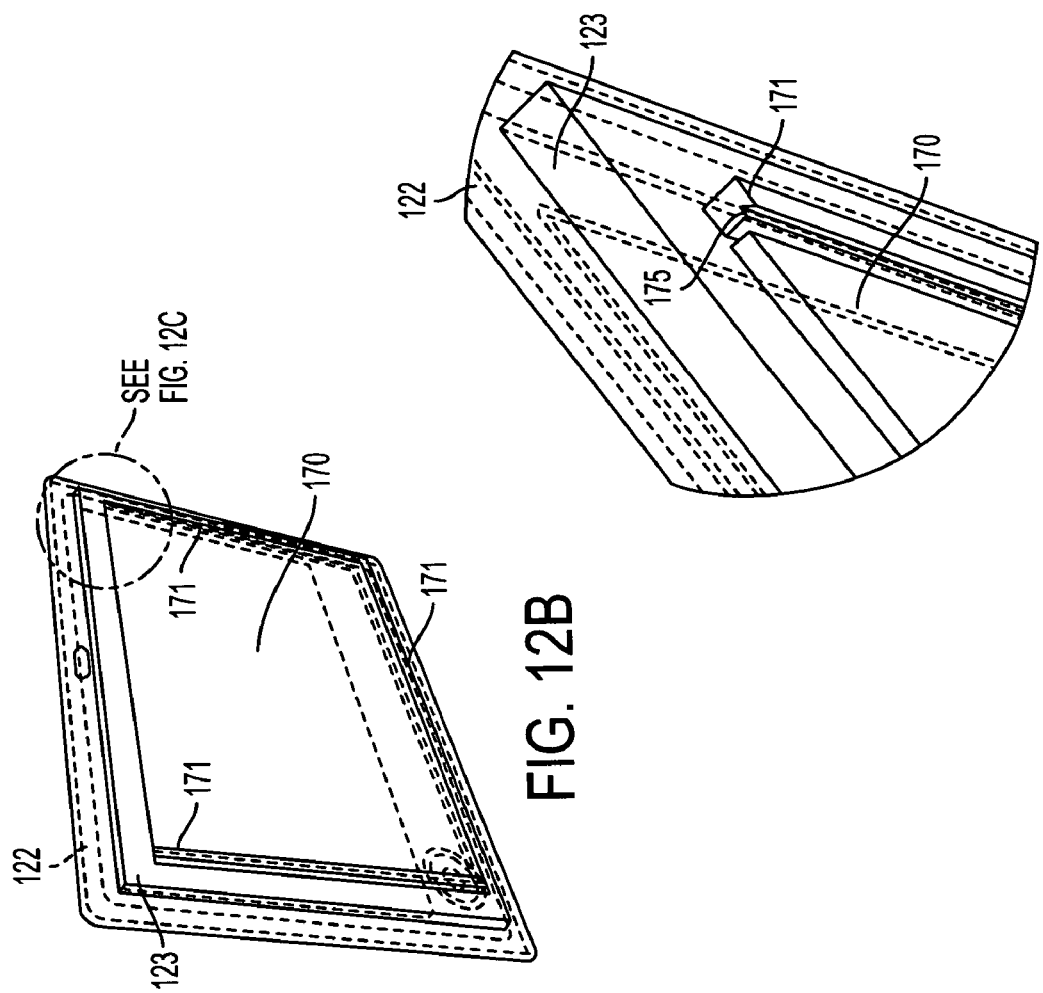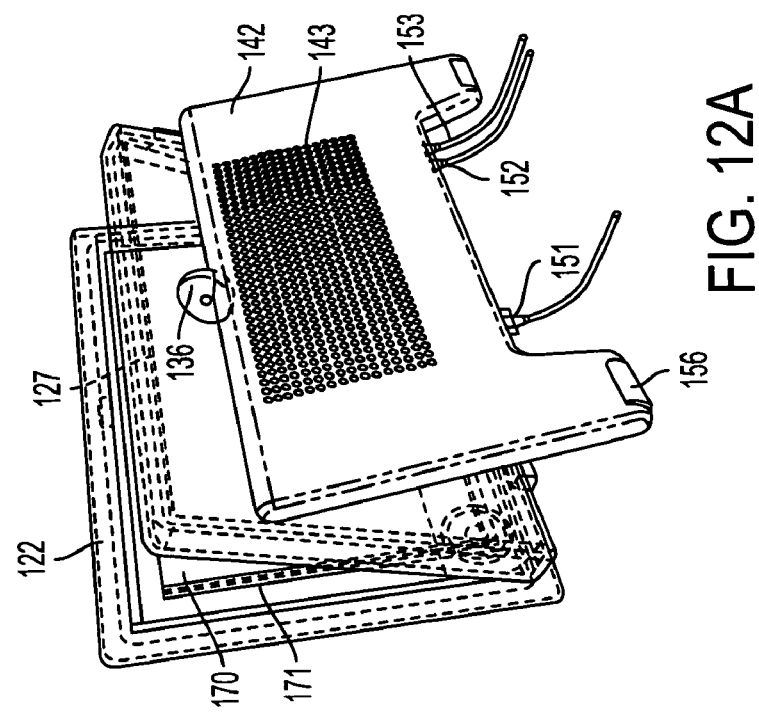

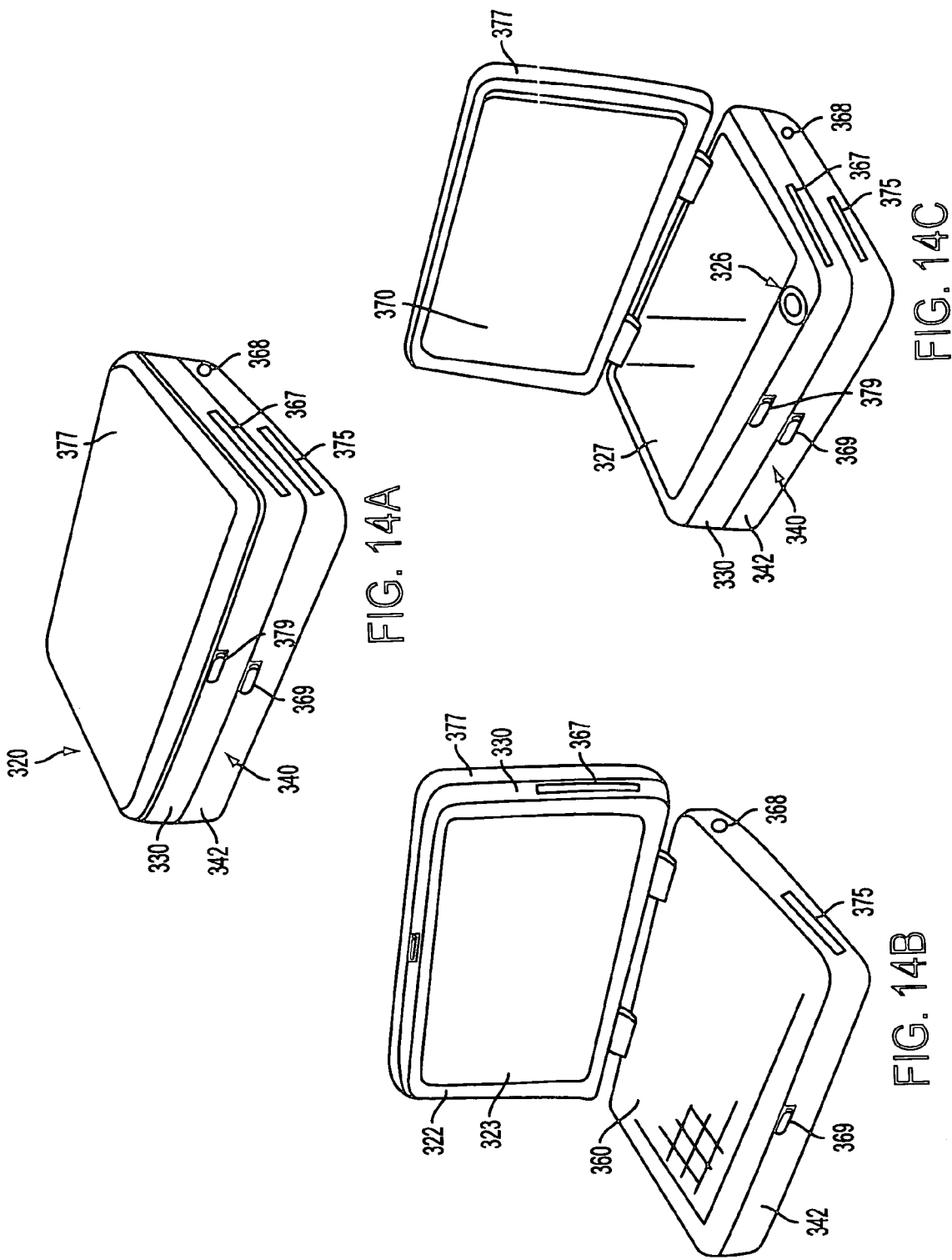

DIGITAL PHOTO ALBUM HAVING A BUILT-IN SCANNER

FIELD OF THE INVENTION

The present invention relates to a digital photo album, and more specifically, a digital photo album having a hard drive and built-in scanner configured to scan photographic prints, save the prints as digital images, transfer digital images to and from external mediums, and view digital images individually or in a slideshow format, all-in-one device.

BACKGROUND OF THE INVENTION

Photographs are an important piece of memorabilia in the lives of many people. Photographic prints relating to childhood, weddings, vacations and other occasions are commonly placed in photo albums, whereby each photo album may be dedicated to a specific occasion.

A conventional photo album holds a plurality of conventional photographic prints, i.e., those recorded on photographic paper. However, as the number of photographic prints in an album becomes substantial, the size of the photo album may become bulky and storage may become a problem. Moreover, if individual photographic prints are not stored in photo albums, simply locating a desired photo print or group of photos may prove to be a difficult task amid a large collection of prints.

Photo scanners have proven to be a popular means for converting conventional photographic prints into digital images, thereby enabling storage of the images on a hard drive. Advantageously, a person then may discard the conventional photographic print, if desired, thereby eliminating the need to store a large number of individual prints. Moreover, a person can easily locate the digital image, e.g., using identification information associated with the image.

However, the scanning of photographic prints can be a complex process, generally involving coupling the scanner to a computer, selecting desired settings, and then saving the images from the scanner to a hard drive of the computer. If it is desired to display the scanned digital images in a slideshow format, then additional connections, software and/or hardware may be required.

There exists a need for a digital photo album that is capable of scanning conventional photographic prints, storing the photographic prints as digital images, and displaying the digital images in a slideshow format that preferably is analogous to a display format associated with a conventional photo album. The use of such an all-in-one digital photo album is expected to reduce the burden experienced by a user in scanning and storing images, as well as creating, editing and viewing a desired photo album.

U.S. Pat. No. 4,888,648 to Takeuchi et al. (Takeuchi) describes an electronic album configured to record, store and display images. In one embodiment, an image reader is configured to convert photographs, pictures or documents into electric signals to obtain corresponding image information that is stored in an image memory and displayed on a display. Index information associated with each image allows a particular image to be retrieved from the memory and displayed on the display. The device also has a keyboard and editor that allows a user to edit stored images.

Additionally, the device described in the Takeuchi patent comprises a disk reader configured to read image information from an image recording medium, e.g., a magnetic disk, and convert the image information into digital signals configured to be displayed on the image display. Furthermore, image information associated with an image may be uploaded to another equipment using an external interface.

The electronic album described in the Takeuchi patent has several drawbacks. First, it is unclear whether flat display 9 may be provided in a closed position during the scanning of a photographic print, i.e., in a position enclosing the print and reducing ambient light during the scanning process. Assuming that the flat display is not provided in such a closed position, then it is expected that a relatively poor scan quality will result since the print is not protected from ambient light. However, assuming that the flat display is closed during the scanning process, then an image may not be viewed on flat display 9 until the display is returned to an upright viewing position. Accordingly, it is expected that either a poor image quality will result, or the user must inconveniently close flat display 9 every time a photo is scanned and then open the display merely to view the image.

Another drawback associated with the device of the Takeuchi patent is the bulky size of the electronic album. It is expected that the device may not be easily transported, and therefore, may not be well-suited for use in certain household applications. Moreover, it would be desirable to use an electronic photo album in conjunction with modern technologies, such as USB ports, firewire ports, and infrared data association (IrDA) ports, thereby facilitating transfer of information between mediums.

In view of these drawbacks of previously known systems, it would be desirable to provide apparatus and methods for a digital photo album having a hard drive and built-in scanner to allow a user to scan, store and view individual photos or photo album slideshows without the need for complex or expensive peripheral devices.

It further would be desirable to provide apparatus and methods for a digital photo album that is configured to scan conventional photographic prints and save the prints as digital images, in addition to being configured to download existing digital images from any number of origin mediums.

It also would be desirable to provide apparatus and methods for a digital photo album that is configured to upload scanned digital images to any number of external destinations or storage destinations.

It also would be desirable to provide apparatus and methods for a digital photo album having editing capabilities and slideshow functionalities.

It still further would be desirable to provide apparatus and methods for a digital photo album having several automated features for ease of use.

SUMMARY OF THE INVENTION

In view of the foregoing, it is an object of the present invention to provide apparatus and methods for a digital photo album having a hard drive and built-in scanner to allow a user to scan, store and view individual photos or photo album slideshows without the need for complex or expensive peripheral devices.

It is also an object of the present invention to provide apparatus and methods for a digital photo album that is configured to scan conventional photographic prints and save the prints as digital images, in addition to being configured to download existing digital images from any number of origin mediums.

It is a further object of the present invention to provide apparatus and methods for a digital photo album that is configured to upload scanned digital images to any number of external destinations or storage destinations.

It is also an object of the present invention to provide apparatus and methods for a digital photo album having editing capabilities and slideshow functionalities.

It is still a further object of the present invention to provide apparatus and methods for a digital photo album having several automated features for ease of use.

These and other objects of the present invention are accomplished by providing a digital photo album comprising a hard drive and built-in scanner configured to scan photographic prints. The digital photo album allows a user to save the photographic prints as digital images on the hard drive, or another medium, and then view individual images or play photo album slideshows comprising a plurality of digital images. Additionally, a user may upload digital images from an external medium to the hard drive of the digital photo album, and then view those images and/or include them in a playlist associated with a slideshow.

In a first embodiment of the present invention, the digital photo album comprises a frame having a screen configured to display one or more digital images. The frame is coupled to a scanner housing, wherein the scanner housing encloses a scanner configured to scan a photographic print. The scanner housing in turn is coupled to a computer housing, the computer housing preferably enclosing a hard drive, a CD/DVD/RW drive, and a microprocessor and memory coupled to the microprocessor. In this embodiment, the computer housing is configured to serve as a support stand for the frame, thereby enabling viewing of images on the screen at a convenient viewing angle.

The digital photo album preferably further comprises an auto-feed scan mechanism comprising a slot formed in a lateral surface of the scanner housing. When a leading edge of a photographic print is inserted into the slot, the auto-feed scan mechanism pulls the print into the scanner housing and into a position suitable for scanning. In a preferred embodiment, the scanner automatically begins to scan the print once the print is completely pulled into the scanner housing via the auto-feed scan mechanism. A digital image corresponding to the print then is automatically displayed on the screen.

A user then may save the digital image to the hard drive or the CD/DVD/RW drive of the digital photo album, or alternatively, the user may save the digital image to an external destination or storage destination. Additionally, a user may choose to edit a digital image, either before or after saving the image. Saved digital images may be added to a playlist, whereby a plurality of images associated with the playlist may be viewed in a slideshow format in a predetermined sequence.

Additionally, digital images may be uploaded from an external medium to the hard drive of the digital photo album. Uploaded images then may be viewed individually on the screen of the digital photo album and/or included in a playlist.

Advantageously, according to one aspect of the present invention, a user may scan photographic prints and save the prints as digital images in a substantially automated manner. Additionally, a user may view scanned images individually or in a photo album slideshow format on the screen, all-in-one device, and without the need for complex or expensive peripheral devices and attachments.

In an alternative embodiment of the present invention, the auto-feed scan mechanism of the digital photo album is omitted. In this embodiment, the frame and the scanner housing may be at least partially separated, and a photographic print may be manually inserted into a position facing the scanner.

In yet another embodiment of the present invention, the digital photo album comprises a scanner housing enclosing a scanner, and further comprises a conventional laptop computer disposed in a conventional laptop computer housing. In this embodiment, a screen coupled to the scanner housing serves as a display for use with the laptop computer, and also serves to display scanned images and slideshows.

When a digital photo album of the present invention is used in conjunction with a conventional laptop computer, the scanner housing may employ the auto-feed scan mechanism described hereinabove to automatically pull a photographic print into the scanner housing for scanning. Alternatively, the digital photo album may employ a top cover, which may be opened to manually insert a photographic print onto a scanner glass for scanning the print.

BRIEF DESCRIPTION OF THE DRAWINGS

Further features of the invention, its nature and various advantages will be more apparent from the accompanying drawings and the following detailed description of the preferred embodiments, in which:

FIGS. 1A–1B are, respectively, front and rear perspective views of a digital photo album provided in accordance with a first embodiment of the present invention;

FIGS. 6A–6B are, respectively, side views depicting a swivel mechanism and hinge mechanism for use in conjunction with the digital photo album of FIG. 1;

FIGS. 7A–7B are schematic views depicting the digital photo album of FIG. 1 in landscape and portrait configurations, respectively;

FIG. 8 depicts an illustrative configuration of control buttons of the digital photo album of the present invention;

FIGS. 12A–12C are, respectively, a rear view showing internal components of the digital photo album of FIG. 11, a rear view of the frame of FIG. 12A, and a detailed view of a loading tray of FIG. 12B;

FIGS. 14A–14C are, respectively, schematic views showing yet a further alternative digital photo album in a closed state, a conventional laptop usage mode, and an open state configured to receive a photographic print for scanning.

DETAILED DESCRIPTION OF THE INVENTION

Figure 2:
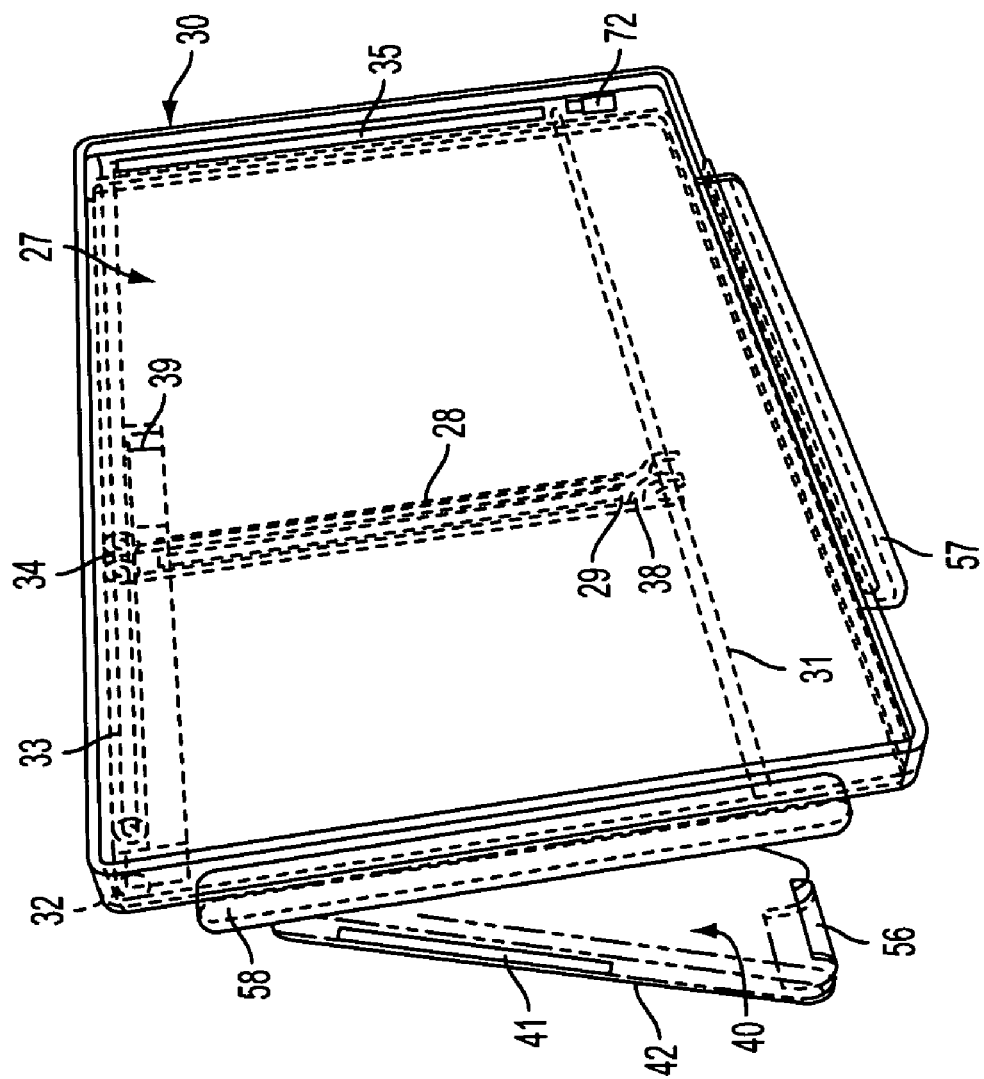
FIG. 2 is a front perspective view of components of a scanner that may be used in conjunction with the digital photo album of FIG. 1.

Referring now to FIG. 1, a first embodiment of a digital photo album provided in accordance with principles of the present invention is described. Digital photo album 20 comprises frame 22 having screen 23, scanner housing 30, and computer housing 42. Scanner housing 30 is coupled to frame 22, while computer housing 42 is coupled to scanner housing 30, preferably via swivel mechanism 36, as depicted in FIG. 1B. As will be apparent to one skilled in the art, other modes of coupling the scanner housing to the computer housing may also be used.

Computer housing 42 houses various electronic components for performing functional operations of digital photo album 20, as described hereinbelow with respect to FIGS. 4–5. Also, in accordance with one aspect of the present invention, computer housing 42 serves as a support stand for frame 22, thereby facilitating viewing of digital images on screen 23. Specifically, computer housing 42 and scanner housing 30 may be positioned at a desired angle with respect to one another, thereby allowing digital photo album 20 to stand by itself in an upright position, as depicted in FIG. 1B.

To further facilitate support of digital photo album 20 in an upright position, computer housing 42 preferably comprises at least one non-skid pad 56, as shown in FIG. 1B. Additionally, frame 22 preferably comprises at least one non-skid pad 57 for stability in a landscape configuration, and further comprises at least one non-skid pad 58 for stability in a portrait configuration (see FIG. 7 hereinbelow).

Referring still to FIG. 1A, frame 22 of digital photo album 20 preferably further comprises infrared data association (IrDA) port 24, which is configured to enable infrared data communication between digital photo album 20 and an exterior device, such as a personal computer, laptop computer, personal digital assistant (PDA), printer, or the like.

Digital photo album 20 further comprises auto-feed scan slot 35, which is disposed in a lateral surface of scanner housing 30, as depicted in FIG. 1B. Auto-feed scan slot 35 may be an external component of auto-feed scan mechanism 25 of FIG. 3B, which is configured to receive photographic prints and automatically pull the prints into scanner housing 30 for scanning, as described in detail hereinbelow with respect to FIG. 3.

Referring now to FIG. 2, components relating to a preferred scanner mechanism of digital photo album 20 are described in greater detail. In FIG. 2, screen 22 of FIG. 1A is omitted for clarity. Scanner 27 of digital photo album 20 preferably comprises lamp 28 and charge-coupled device (CCD) sensor array 29, each of which is disposed on sliding bar 38. CCD sensor array 29 preferably is a light-sensitive integrated circuit that stores and displays data associated with a photographic print by converting each pixel of the print into an electrical charge, wherein each electrical charge has an intensity associated with a color in the color spectrum. Ribbon cable 39 relays the electrical charges to memory 46b of computer 40 (see FIG. 5) as the image is scanned.

Scanner 27 preferably further comprises track 31, drive motor 32, screw feed 33, and carriage 34, which is coupled to sliding bar 38. When a signal is sent to drive motor 32 to begin the scanning process, rotation of drive motor 32 is translated into longitudinal movement of carriage 34 via screw feed 33. The longitudinal movement of carriage 34 in turn enables longitudinal movement of sliding bar 38, guided by track 31, to facilitate scanning of a photographic print. It will be apparent to one skilled in the art that various modifications may be made to scanner 27, for example, by varying the drive mechanisms employed, without departing from the scope of the present invention.

Figure 3B:
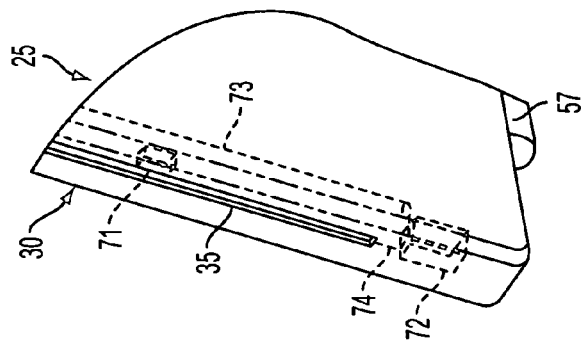
FIGS. 3A–3C are, respectively, a rear view showing various internal components of the digital photo album of FIG. 1, a rear view showing details of an auto-feed mechanism, and a photographic print configured to be inserted into the auto-feed mechanism of FIG. 3B.
Figure 3C:
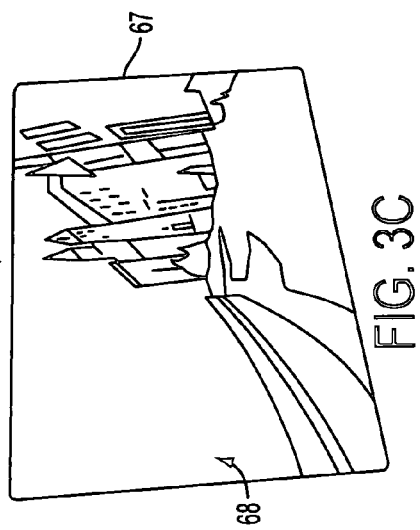
Figure 3A:
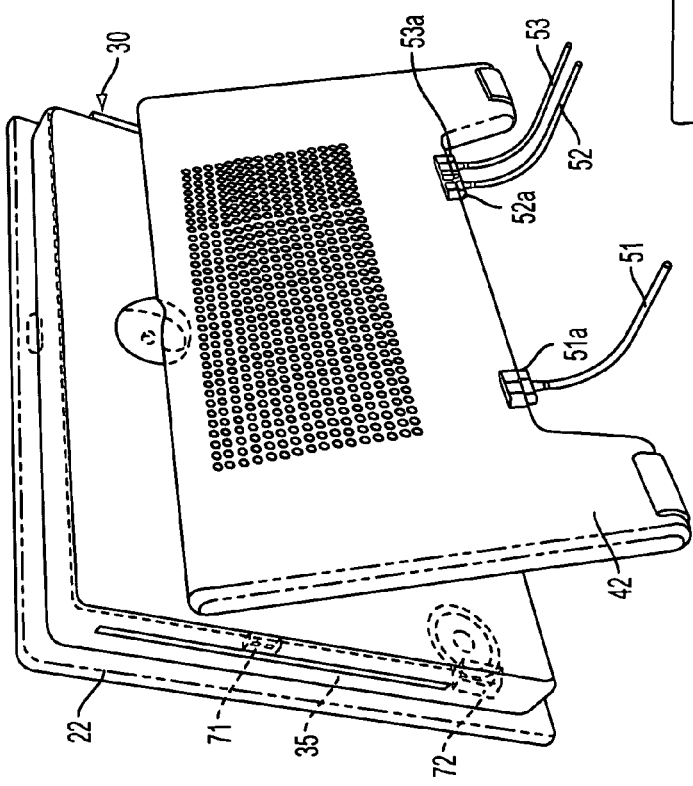

Referring now to FIG. 3, features of an auto-feed scan mechanism that may be used in conjunction with digital photo album 20 are described in greater detail. FIG. 3B provides an enlarged view of a corresponding region of FIG. 3A, to better illustrate components of auto-feed scan mechanism 25. It should be noted that, in FIG. 3B, frame 22 and computer housing 42 have been removed for purposes of illustration.

As shown in FIG. 3B, auto-feed scan mechanism 25 preferably comprises slot 35, optical sensor 71, drive motor 72, which is coupled to reduction gear assembly 74, and at least one pinch roller 73. As shown in FIGS. 3A–3B, auto-feed scan slot 35 is disposed in a lateral surface of scanner housing 30, while the other components of auto-feed scan mechanism 25 are disposed within scanner housing 30.

Optical sensor 71 is configured to provide feedback to microprocessor 46a of computer 40 (see FIG. 5) to notify the microprocessor as to when leading edge 67 of photographic print 66 has passed through slot 35. In response to instructions received from microprocessor 46a, drive motor 72 is actuated to cause rotation of gear assembly 74. At this time, pinch roller 73, which is coupled to gear assembly 74, is actuated to pull photographic print 66 into slot 35 and position print 66 so that front side 68 of the print is facing CCD array 29 of scanner 27 of FIG. 2.

A second optical sensor (not shown), coupled to microprocessor 46a, may be employed to facilitate proper positioning of photographic print 66 with respect to scanner 27. Additionally, it will be apparent to one skilled in the art that any number of gearing mechanisms and pinch rollers may be employed to facilitate actuation of auto-feed scan mechanism 25.

Figure 4:
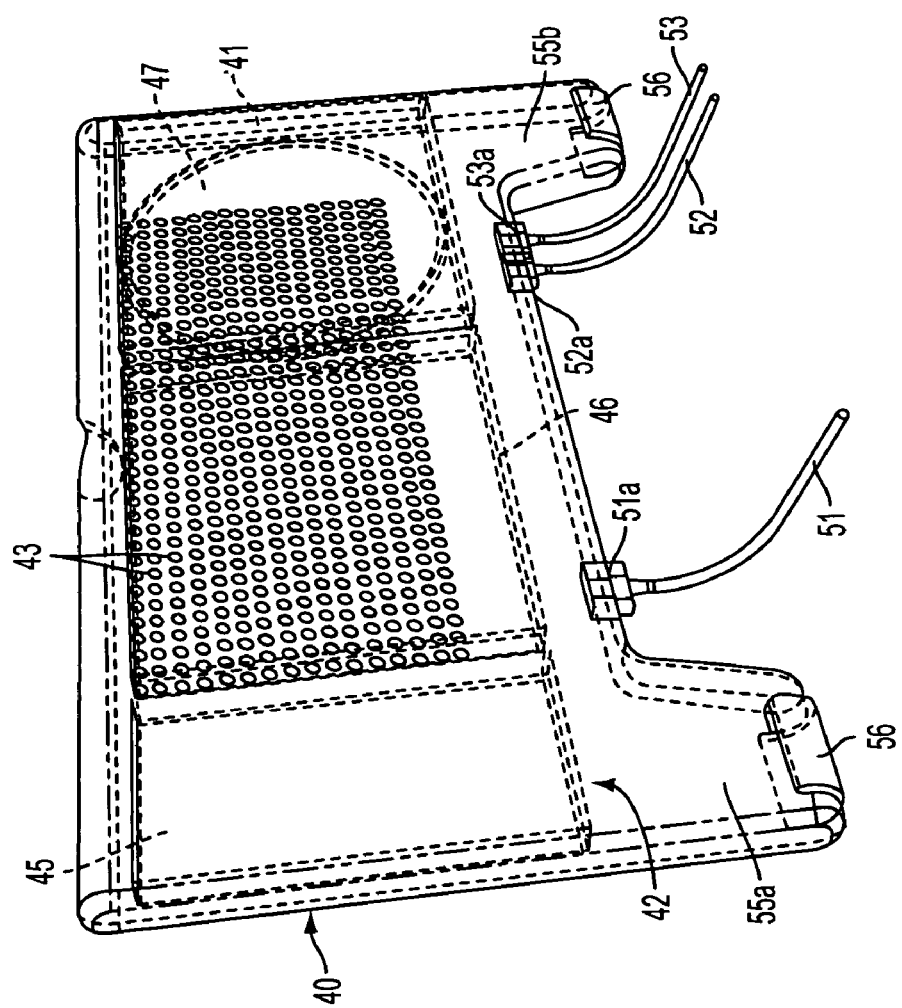
FIG. 4 is a rear view showing various internal components and connections associated with a computer of the digital photo album of FIG. 1.

Referring now to FIG. 4, components associated with computer 40 and computer housing 42 are described in greater detail. Computer 40 preferably comprises hard drive 45, motherboard 46 comprising microprocessor 46a and memory 46b (see FIG. 5), and CD/DVD/RW Drive 47, each of which is housed within computer housing 42 having vent holes 43, as depicted in FIG. 4. A user may access CD/DVD/RW drive 47 via drive opening 41, which is coupled to a lateral surface of computer housing 42.

Computer housing 42 preferably comprises at least one support leg 55 having non-skid pad 56, and more preferably, comprises first support leg 55a separated a distance apart from second support leg 55b, as illustratively depicted in FIG. 4. Computer housing 42 preferably is coupled to power-in port 51a, which in turn is configured to be coupled to power input wire 51. Computer housing 42 further is coupled to USB data port 52a and firewire data port 53a, which are configured to be coupled to USB wire 52 and firewire 53, respectively.

In a preferred embodiment, at least one of ports 51a, 52a and 53a is disposed between first and second legs 55a and 55b, as shown in FIG. 4. Alternatively, the ports may be coupled to any other suitable surface of computer housing 42.

Figure 5:
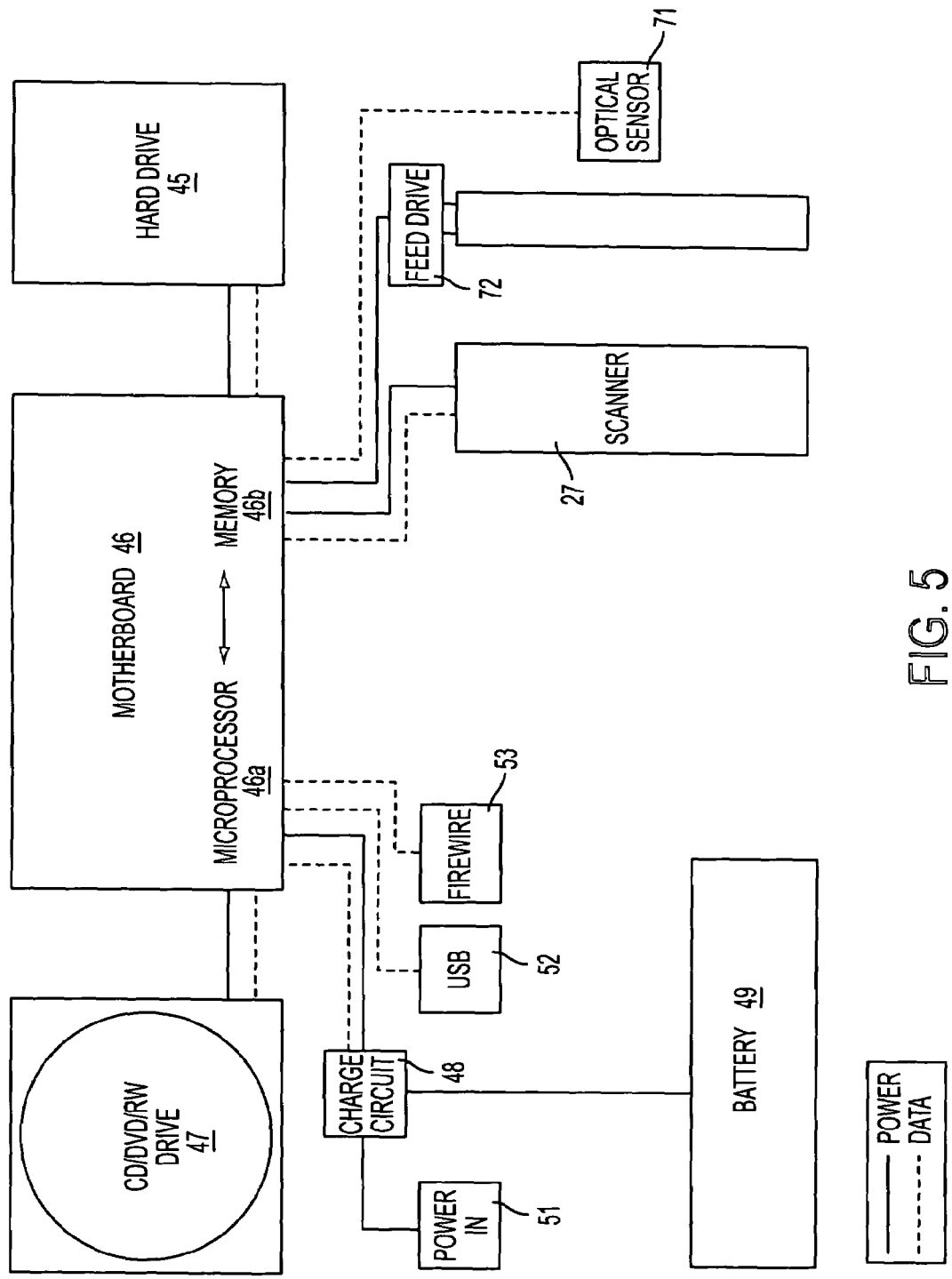
FIG. 5 is a schematic depicting various electronic connections associated with the digital photo album of FIG. 1.

Referring now to FIG. 5, a schematic of a preferred electronic configuration of digital photo album 20 is shown, whereby solid lines are indicative of power transfer, and dashed lines are indicative of data transfer. As depicted in FIG. 5, power may be supplied to various components of digital photo album 20 via power input 51 and/or battery 49.

USB wire 52 and firewire 53 are configured to transfer data from digital photo album 20 to external mediums via ports 52a and 53a, respectively, as well as receive data from the external mediums. As will be described hereinbelow with respect to FIG. 10, data may be received from one or more origin mediums 111, such as a computer or digital camera, and data also may be transferred from computer 40 to any number of storage destinations 114 and/or external media destinations 116.

Referring still to FIG. 5, and as described in part hereinabove, optical sensor 71 provides feedback to microprocessor 46a to notify the microprocessor as to when leading edge 67 of photographic print 66 has passed through slot 35. In response to data instructions received from microprocessor 46a, drive motor 72 is actuated to enable the photographic print to be pulled into an area in front of scanner 27. Scanner 27 then may be automatically actuated to scan the photographic print. Digital image data associated with the scanned print may be saved to hard drive 45, CD/DVD/RW drive 47, another internal destination 115, or any one of storage destinations 114 and/or external destinations 116 of FIG. 10.

Referring now to FIG. 6, different means for coupling scanner housing 30 to computer housing 42 are described. In FIG. 6A, swivel mechanism 36 of FIG. 1B is employed as the means for coupling, thereby permitting a user to rotate frame 22 with respect to computer housing 42. In a preferred embodiment, swivel mechanism 36 enables rotation of frame 22 between first and second positions, illustratively depicted FIG. 7A and FIG. 7B, respectively. In the first position, digital image 77 playing on screen 23 may be viewed in a landscape orientation, as shown in FIG. 7A. In the second position, digital image 77 playing on screen 23 may be viewed in a portrait orientation, as shown in FIG. 7B. As will be apparent to one skilled in the art, image 77 may be converted from a landscape orientation to a portrait orientation to fill the entire screen, as illustratively depicted, when frame 22 is rotated from the first position to the second position, or vice versa.

Referring to FIG. 6B, in an alternative embodiment, hinge mechanism 37 may be employed as the means for coupling scanner housing 30 to computer housing 42, in lieu of swivel mechanism 36. When hinge mechanism 37 is employed, angle α, formed between a main axis of scanner housing 30 and a main axis of computer housing 42, may be adjusted to vary a viewing angle of screen 23, or to increase upright stability of digital photo album 20.

Referring now to FIG. 8, a preferred configuration of control buttons 26 of FIG. 1A is described. Control buttons 26 preferably are coupled to frame 22, as shown in FIG. 1A, and electronically coupled to microprocessor 46a of computer 40. In one embodiment, memory 46b may store a plurality of preset commands corresponding to a predefined function of digital photo album 20. Microprocessor 46a may be configured to receive data from control buttons 26, match the data against the plurality of preset commands in memory 46b, and cause digital photo album 20 to perform the predefined function that corresponds to the input command.

Control buttons 26 preferably comprise menu button 61, fast-forward button 62, play/pause button 63, rewind button 64, and enter button 65, as shown in FIG. 8. Buttons 61, 62 and 64 are depicted as being configured to perform a plurality of functions based on the number of times a user pushes the button.

Figure 9:
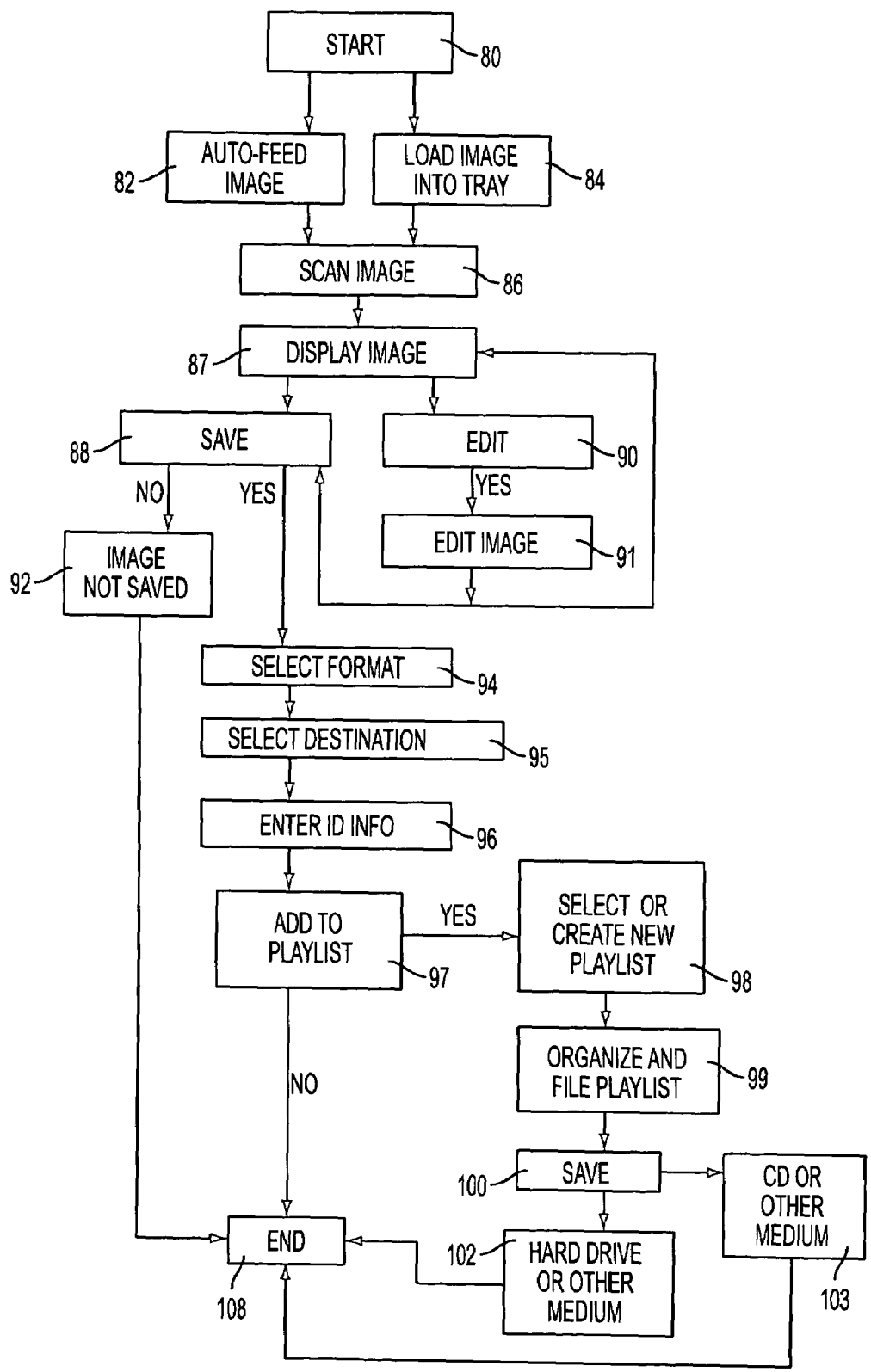
FIG. 9 is a flowchart describing one exemplary operational sequence of a digital photo album in accordance with principles of the present invention.

For example, in one method of use, a user may view a slideshow, i.e., by creating a playlist comprising a plurality of digital images (see FIG. 9). While viewing the slideshow, a user may push fast-forward button 62 three times and then press enter button 65 once. Microprocessor 46a recognizes the input, and compares the input against the plurality of preset commands in memory 46b. Once microprocessor 46a recognizes the match, the microprocessor instructs digital photo album 20 to forward to the end of the slide show.

It will be understood by one skilled in the art that control buttons 26 may be used to perform any number of functions associated with digital photo album 20, and are not intended to be limited by the illustrative functions depicted in FIG. 8. Similarly, it will be apparent to one skilled in the art that control buttons 26 may be coupled to digital photo album 20 at a different location, or at a remote location, e.g., using a remote control. Further, it will be understood by one skilled in the art that control buttons 26 may comprise any number of buttons that are arranged in any number of configurations, and are not intended to be limited by the exemplary configuration depicted herein.

Referring now to FIG. 9, a flow diagram is provided to illustrate one exemplary manner in which digital photo album 20 of FIG. 1 may be used. As described hereinabove, digital photo album 20 advantageously may be used to scan conventional photographic prints, then display, save, edit, organize and/or transfer digital images, among other functions described herein.

In a first step, shown in block 80, a user performs preliminary operations, such as connecting power-in wire 51 into input port 51a. The user then turns the unit on, e.g., by pressing a conventional power button (not shown).

In a next step, shown in block 82, a user may place a photographic print into auto-feed scan slot 35 of FIG. 1B. As described hereinabove, optical sensor 71 of FIG. 3B is actuated when it recognizes that leading edge 67 of photographic print 66 is inserted at least partially into slot 35. Optical sensor 71 relays this data to microprocessor 46a, which in turn causes actuation of drive motor 72, gear assembly 74 and pinch roller 73. This causes the photographic print to be loaded within an area inside of scanner housing 30, and in a position facing CCD sensor array 29 of scanner 27.

In an alternative method step, described hereinbelow with respect to alternative digital photo album 120 of FIGS. 11–12, a user may "open" the digital photo album by at least partially separating frame 122 from scanner housing 130. The user then may manually insert the photographic print into tray 171 (see FIGS. 12A–12C). This step, shown in block 84, may be used in lieu of step 82, depending on which digital photo album is used.

When the photographic print is properly positioned facing the CCD array of the scanner, scanner 27 preferably is automatically actuated, e.g., using a sensor (not shown), and the photographic print is scanned, as shown in block 86. Alternatively, a series of prompts may be provided on screen 23, and a user may actuate control buttons 26, in response to the prompts, to begin the scanning process. Once the photographic print is scanned, a digital image corresponding to the print is automatically displayed on screen 23, as represented by block 87.

When the digital image is displayed, a user may perform a wide range of functions, e.g., save, edit, send to personal computer, etc. For simplicity, only two options are illustrated in the flowchart of FIG. 9. Block 88 depicts a "save" option that a user may select, for example, in response to prompts automatically provided on screen 23. If the user desires to discard of the digital image, then the image is not saved (block 92).

If a user chooses to save a displayed image, the user may first be asked to select an image format (block 94). Exemplary image formats are represented by object-based image group 112 and pixel-based image group 113 of FIG. 10. Object-based image formats may include, for example, TXT, DWG, CDR, DOC or other formats, while pixel-based formats may include, for example, BMP, JPG, GIF, TIFF or other image formats.

Figure 10:
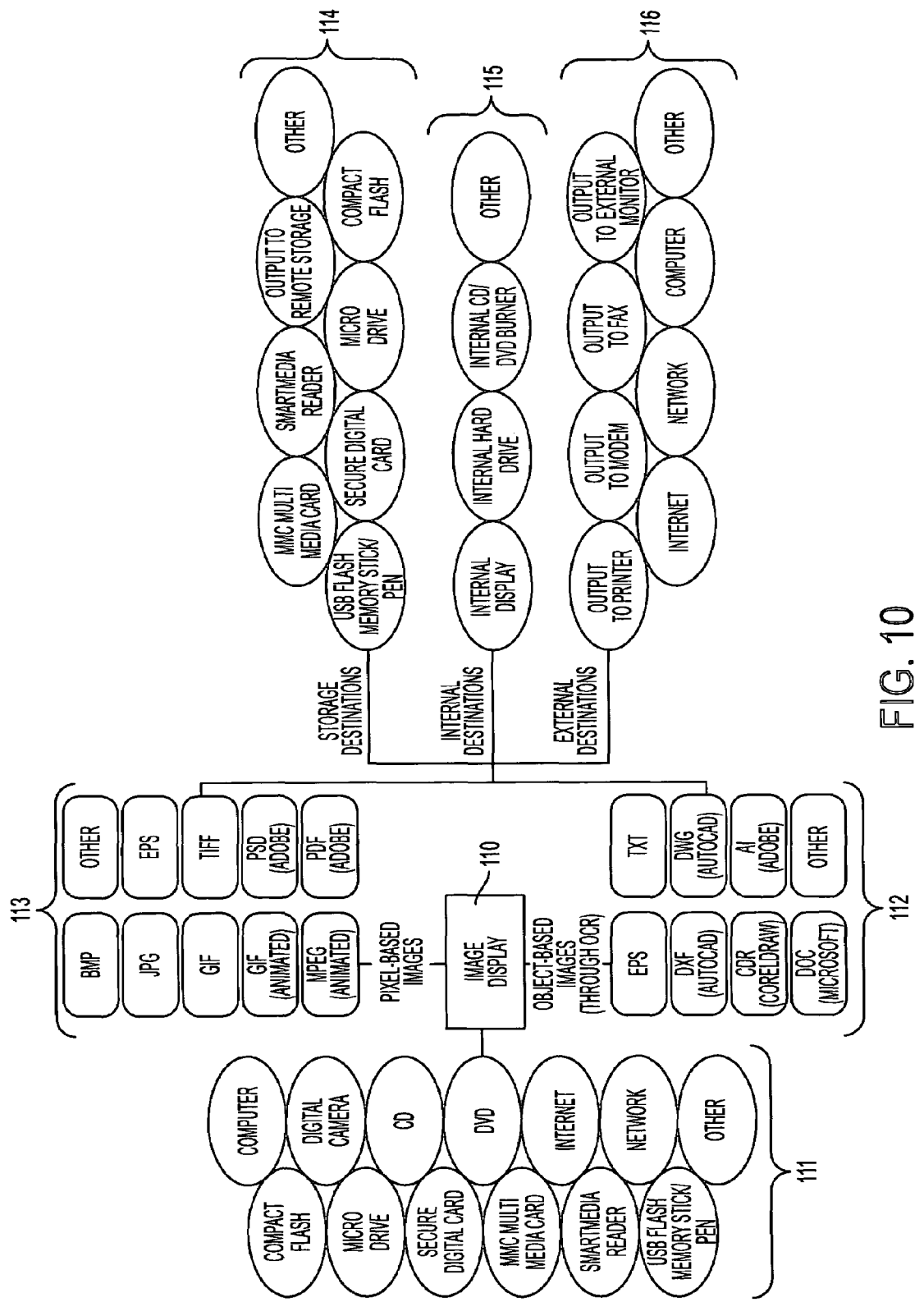
FIG. 10 is a flowchart depicting various mediums that may be used in conjunction with a digital photo album of the present invention.

As illustratively depicted by block 110 of FIG. 10, when a scanned or uploaded image is displayed on screen 23, a user may choose to format the displayed image, and then save the displayed image to a desired destination. Accordingly, once a user selects a desired format, the user then may be prompted to provide a desired destination (block 95 of FIG. 9). Several illustrative destinations are shown in FIG. 10, including a variety of storage destinations 114, internal destinations 115 and external destinations 116. The image may be saved to external destinations, such as a computer, an internet storage site, a personal digital assistant (PDA) or other destination by way of USB wire 52, firewire 53, or by using infrared data communication via IrDA port 24.

Once the user has selected a storage destination, the user may be asked to enter identification information associated with the image (block 96). The identification information, such as a name or date associated with the image, is used to facilitate retrieval of the image from the storage destination.

Referring still to FIG. 9, at any time that an image is displayed on screen 23, a user may choose to edit the image (block 90). Editing software, for example, Adobe® Photoshop®, may be provided on computer 40 of digital photo album 20, or may be accessed using CD/DVD/RW drive 47 or another drive. Alternatively, the editing software may be provided on an external computer (not shown) or drive that is electronically coupled to digital photo album 20. Editing functions that may be performed include, for example, formatting the size of the image, changing a resolution associated with the image, red eye reduction, or otherwise varying the size, shape or content of the image (block 91). As will be apparent to one skilled in the art, a user may choose to edit an image at any time before or after the image is saved to any one of destinations 114–116 of FIG. 10, i.e., editing functions 90–91 may be performed before or after the saving functions depicted in blocks 94–96.

After an image has been saved (blocks 94–96), a user may decide to add the saved image to a playlist (block 97). The user may add the digital image to an existing playlist, or create a new playlist and add the image to the new playlist (block 98). Exemplary playlists may include "Vacation," "Childhood," "Wedding," "Christmas," and "All Pictures," although any number of possibilities exist. As will be apparent to one skilled in the art, each playlist may be organized, for example, so that a plurality of images may be displayed in a desired photo album sequence (block 99). In this sequence, a slideshow may be viewed using navigational commands associated with control buttons 26 (see FIG. 8).

Once a playlist has been organized in a desired manner, the playlist may be saved to any one of storage destinations 114–116 of FIG. 10, in a manner similar to that described hereinabove with respect to saving an individual image. Therefore, in the flowchart of FIG. 9, functions performed in blocks 102 and 103 may correspond to functions described hereinabove with respect to block 95.

In a preferred embodiment, a user may choose to save an image directly from digital photo album 20 to an internet storage location. For example, the user may subscribe to a service that allows subscribers to pay a small monthly fee for purposes of accessing internet data storage space. The internet storage service may be operatively coupled to digital photo album 20, e.g., using a DSL line, a cable line, or by satellite hookup. A user of digital photo album 20 may be prompted for authentication information associated with the internet storage site, such as a username and password. Once the authentication information is verified, the user may conveniently store large files directly from digital photo album 20 to the internet storage site.

It will be apparent to one skilled in the art that the enumerated lists depicted in FIG. 10 are merely for purposes of illustration, and other mediums not specifically enumerated herein may be used in conjunction with digital photo album 20 of the present invention.

Additionally, for simplicity, several other operational method steps that may be used in conjunction with digital photo album 20 have been omitted from the flow diagram of FIG. 9. For example, at any time during operation, at least one digital image may be uploaded to hard drive 45 of digital photo album 20, for example, via USB line 52, firewire 53 or IrDA port 24. The images may be uploaded from any number of origins 111, as illustratively enumerated in FIG. 10. Uploaded images are displayed on screen 23 (block 110 of FIG. 10), and may be formatted and saved as individual images on hard drive 45 and/or added to playlists associated with digital photo album 20, as described hereinabove. Also, at any time during operation, one or more saved photos may be deleted from hard drive 45 or deleted from a playlist.

An "eject" button (not shown) may be provided, thereby allowing a user to eject photographic print 66 from auto-feed scan slot 35. The eject button may be operatively coupled to drive motor 72 of auto-feed scan mechanism 25, such that drive motor 72 causes a rotation of pinch roller 73 that causes the photographic print to be ejected from scanner housing 30.

Figure 11B:
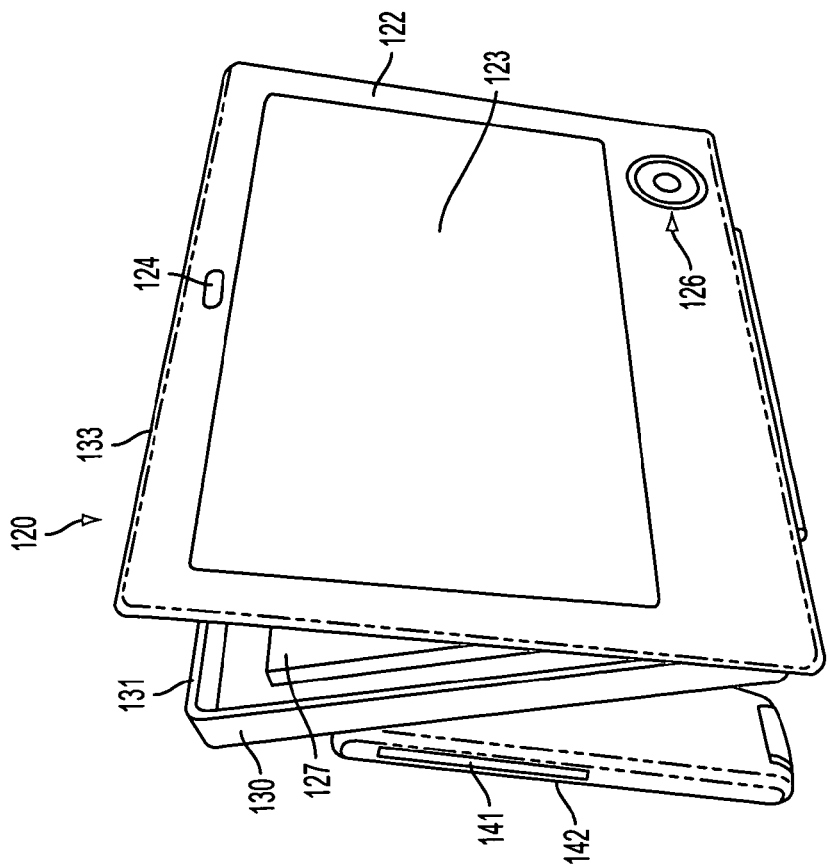
FIGS. 11A–11B are front perspective views of an alternative digital photo album of the present invention in closed and open modes, respectively.

Referring now to FIGS. 11–12, digital photo album 120 of an alternative embodiment of the present invention is substantially the same as digital photo album 20 of FIGS. 1–10, with a main exception that auto-feed scan mechanism 25 is omitted. Also, in the embodiment of FIGS. 11–12, scanner housing 130 and frame 122 of digital photo album 120 are configured to be at least partially separated in an "open" mode, as depicted in FIG. 11B. In the open mode, a hinge (not shown), which may be used to couple scanner housing 130 to frame 122, enables a partial separation between upper portion 133 of frame 122 and upper portion 131 of scanner housing 130, as depicted in FIG. 11B. In the open mode, a user may manually insert a photographic print, as described hereinbelow.

Referring now to FIG. 12, alternative digital photo album 120 further comprises foam backing 170 and tray 171. Foam backing 170 and tray 171 preferably are disposed on a reverse side of screen 123, i.e., a side of screen 123 that is not externally visible to a user in a closed mode. Tray 171 preferably surrounds three of the four sides of foam backing 170, as shown in FIG. 12B, so that a user may load a photographic print into tray 171 manually. As shown in FIG. 12C, tray 171 comprises groove 175 in which the photographic print may be placed for subsequent scanning. As will be apparent to one skilled in the art, at least one textual or graphic instruction (not shown) may be provided in an instruction manual or disposed on digital photo album 120 to instruct a user of a proper manner in which to insert the photographic print into scanning tray 171.

Figure 11A:
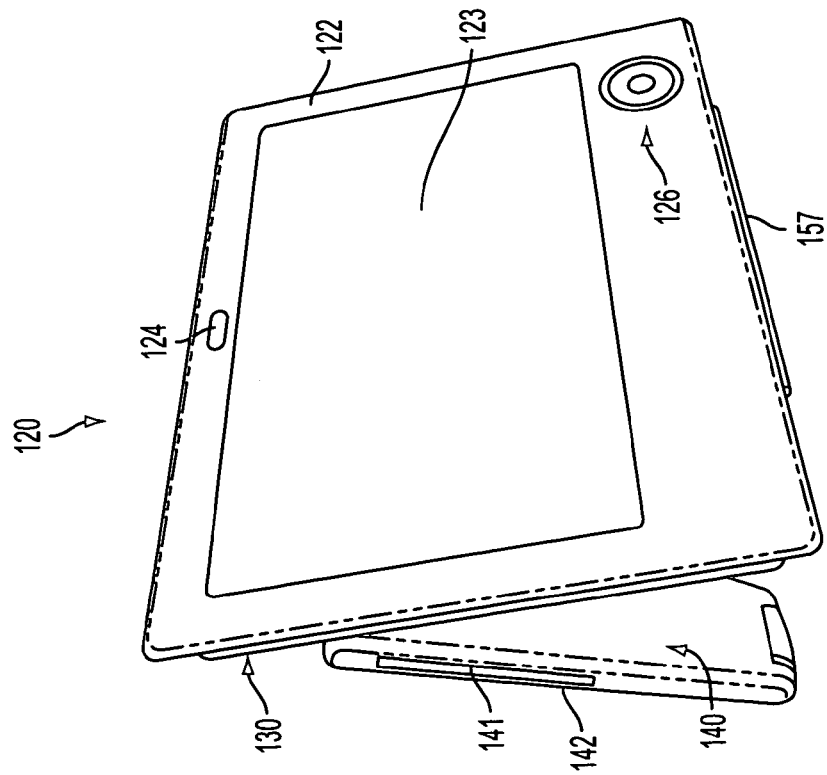

Once a photographic print is properly positioned within tray 171, a user may return digital photo album 120 to the closed mode, depicted in FIG. 11A, for example, by manually moving upper portion 133 of frame 122 towards upper portion 131 of scanner housing 130. Once digital photo album 120 is returned to the closed mode, an optical sensor (not shown) may detect that a photographic print has been loaded into tray 171. The optical sensor may relay a message to the microprocessor to begin the scanning process. Scanner 127 of FIG. 11B, which preferably is substantially identical to scanner 27 of FIG. 2, then scans the photographic print.

In a preferred embodiment, the scanning process automatically begins when the optical sensor detects the photographic print in tray 171. Alternatively, once digital photo album 120 is returned to the closed mode, a prompt may be provided on screen 123, for example, to instruct the user to press one or more of buttons 126 to actuate scanner 127.

When the scanning process is complete, digital photo album 120 preferably automatically displays a digital image corresponding to the scanned photo on screen 123 (block 110 of FIG. 10). Then, the digital image may be formatted and saved to one or more destinations 114–116 of FIG. 10. Additionally, the image may be edited, added to a playlist, etc., as set forth hereinabove.

Referring now to FIG. 13, yet a further alternative embodiment of the present invention is described. Digital photo album 220 of FIG. 13 is similar to digital photo album 20 of FIGS. 1–10, with a main exception that conventional laptop computer housing 242 is used in lieu of computer housing 42, and conventional laptop computer 240 having keyboard 260 is employed instead of computer 40. Except as otherwise noted, components of digital photo album 220 correspond to like numbers of digital photo album 20, e.g., auto-feed scan slot 235 of FIG. 13 corresponds to auto-feed scan slot 35 of FIG. 1B.

Digital photo album 220 comprises power-in port 268 and at least one storage drive 267, e.g., for use with a CD or DVD. Digital photo album 220 also preferably comprises a USB port, firewire port and irDA port, as described hereinabove, and may comprise any other ports associated with a conventional laptop computer, as will be apparent to one skilled in the art.

Figure 13B:
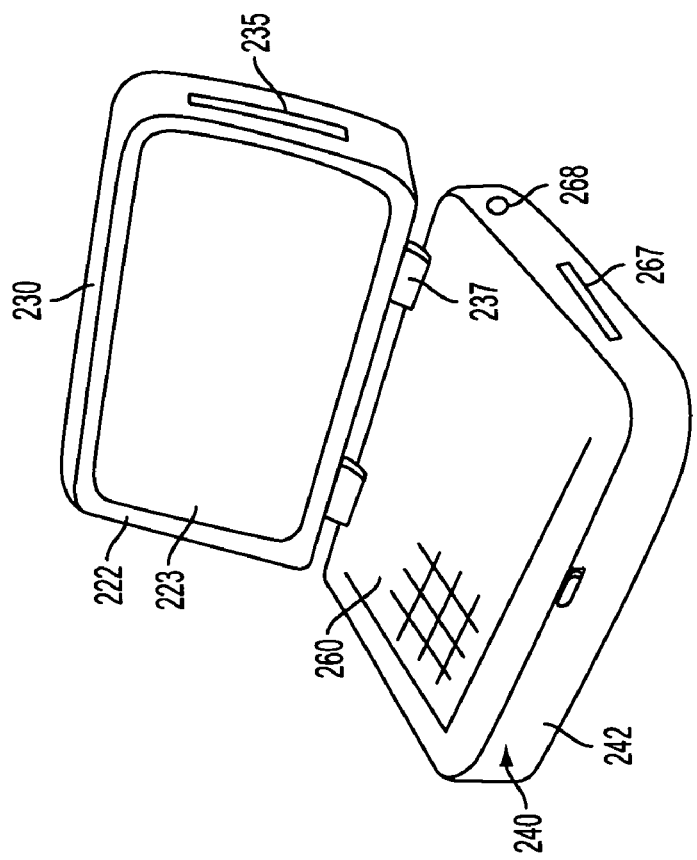
FIGS. 13A–13B are schematic views showing a further alternative digital photo album provided in accordance with principles of the present invention in closed and open states, respectively.
Figure 13A:
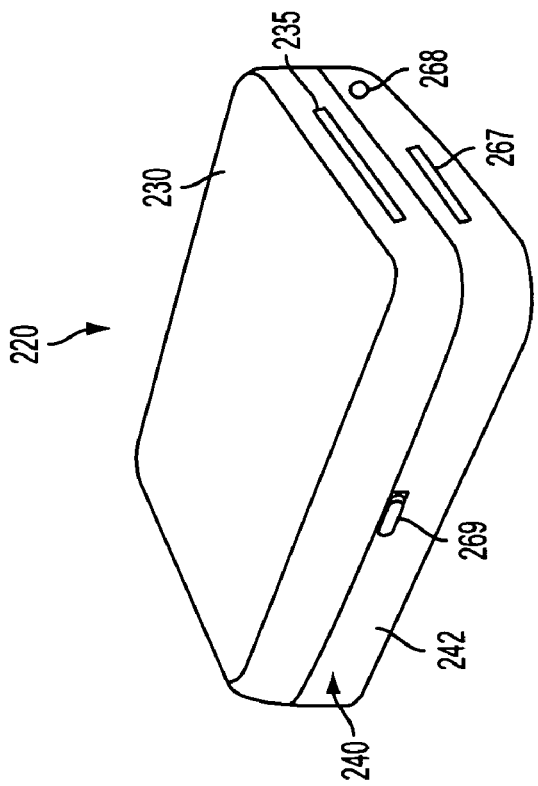

Digital photo album 220 comprises a closed state, which may be used for storage, as shown in FIG. 13A, and an open state, which is used during operation, as shown in FIG. 13B. Hinge mechanism 237 preferably is used to allow digital photo album 220 to transition between the open and closed states, and latch mechanism 269 may be employed to secure frame 222 to computer housing 242 in the closed state.

In the embodiment of FIG. 13, frame 222 having screen 223 is, in effect, the same entity as scanner housing 230. Accordingly, frame 222 houses a scanner and related components that preferably are provided in accordance with scanner 27 of FIG. 2. Similarly, digital photo album 220 comprises an auto-feed scan mechanism similar to auto-feed scan mechanism 25 of FIG. 3. Accordingly, digital photo album 220 is configured to automatically receive and scan photographic prints.

Digital photo album 220 may operate in accordance with any of the methods set forth hereinabove with respect to FIGS. 1–10. For example, digital photo album 220 may transfer data to, and upload data from, any of the mediums illustratively depicted in FIG. 10.

Advantageously, in the embodiment of FIG. 13, a user may operate a conventional laptop computer and, if desired, automatically scan and save images to a hard drive of the laptop computer, without the need for an additional scanner and other peripheral devices. Keyboard 260 may be used to perform the functions associated with control buttons 26, and therefore may be used to view, edit, add images to playlists, play the playlists, and so forth, as generally set forth hereinabove.

Referring now to FIG. 14, a further alternative embodiment of the present invention is described. Digital photo album 320 of FIG. 14 is similar to digital photo album 120 of FIGS. 11–12, and components of digital photo album 320 correspond to like numbers of digital photo album 120, except as noted hereinbelow.

Digital photo album 320 comprises computer housing 342, scanner housing 330, and top cover 377. In a preferred embodiment, latch mechanisms 369 and 379 releasably secure computer housing 342 to scanner housing 330 and scanner housing 330 to top cover 377, respectively.

Conventional laptop computer 340 is disposed within computer housing 342, which is coupled to power-in port 368 and access drive 375. Digital photo album 320 also preferably comprises a USB port, firewire port and irDA port, as described hereinabove, and any other ports associated with a conventional laptop computer, as will be apparent to one skilled in the art.

Scanner housing 330 is coupled to screen 323 on a first surface, and further is coupled to scanner glass 327 on an opposing surface, as depicted in FIGS. 14B–14C, respectively. Scanner housing 330 houses a scanner that preferably is provided in accordance with scanner 27 of FIG. 2. Scanner housing 330 preferably comprises auxiliary access drive 367. It should be noted that, in the embodiment of FIG. 14, the auto-feed scan mechanisms associated with digital photo albums 20 and 220 are omitted.

In a first mode, depicted in FIG. 14B, digital photo album 330 is configured to be used in accordance with a conventional laptop computer using keyboard 360 and display screen 323. In an alternative mode, a photographic print may be scanned by placing the print face-down on scanner glass 327, closing top cover 377 having foam layer 370, and actuating the scanner.

As will be apparent to one skilled in the art, scanned images may be saved on a hard drive associated with computer 340. Moreover, digital photo album 320 is intended to operate in accordance with any of the methods set forth hereinabove with respect to digital photo albums 20, 120 and 220.

While preferred illustrative embodiments of the invention are described above, it will be apparent to one skilled in the art that various changes and modifications may be made therein without departing from the invention. The appended claims are intended to cover all such changes and modifications that fall within the true spirit and scope of the invention.

What is claimed is:

1. A digital photo album for viewing at least one digital image, the digital photo album comprising:
   a frame having a screen configured to display a digital image;
   a scanner housing and a computer housing;
   the scanner housing coupled to the frame;
   a scanner disposed within the scanner housing, the scanner configured to scan at least one photographic print; and
   the computer housing enclosing a hard drive, a microprocessor and a memory coupled to the microprocessor, wherein the computer housing is configured to serve as a support stand for the frame and the scanner housing.

2. The digital photo album of claim 1 wherein the hard drive is configured to store a digital image associated with the photographic print.

3. The digital photo album of claim 1 wherein the hard drive is configured to store at least one photo album playlist comprising a plurality of digital images.

4. The digital photo album of claim 1 wherein the digital photo album is configured to download data from at least one origin medium.

5. The digital photo album of claim 1 wherein the digital photo album is configured to upload data to at least one destination medium.

6. The digital photo album of claim 1 wherein the computer housing comprises a first support leg separated a distance apart from a second support leg.

7. The apparatus of claim 6 further comprising at least one data port disposed between the first support leg and the second support leg, the data port selected from the group consisting of a USB port, a firewire port, and a power-in port.

8. The digital photo album of claim 6 further comprising at least one non-skid pad disposed on the first support leg and the second support leg.

9. The digital photo album of claim 1 further comprising at least one non-skid pad disposed on at least one lateral surface of the frame.

10. The digital photo album of claim 1 further comprising a swivel mechanism that couples the computer housing to the scanner housing.

11. The digital photo album of claim 10 wherein the swivel mechanism allows the screen to be transported between a first orientation configured to display a digital image in a landscape configuration and a second orientation configured to display a digital image in a portrait configuration.

12. The digital photo album of claim 1 further comprising a hinge mechanism that couples the computer housing to the scanner housing.

13. The digital photo album of claim 1 further comprising an auto-feed scan mechanism, the auto-feed scan mechanism comprising a slot disposed in a lateral surface of the scanner housing, wherein the slot is configured to receive a photographic print.

14. The digital photo album of claim 13 further comprising:
- an optical sensor disposed inside the scanner housing, the optical sensor coupled to the microprocessor;
- a drive motor; and
- at least one pinch roller coupled to the drive motor, the pinch roller configured to pull a photographic print into the scanner housing when the drive motor is actuated based on a response provided by the optical sensor.

15. The digital photo album of claim 1 wherein the scanner housing and the frame are configured to be at least partially separated to allow a user to position a photographic print at a location between the frame and the scanner.

16. The digital photo album of claim 15 further comprising a tray having a groove into which the photographic print may be placed.

17. The digital photo album of claim 1 further comprising a plurality of control buttons coupled to the frame and electronically coupled to the microprocessor.

18. The digital photo album of claim 1 further comprising a USB data port coupled to the computer housing, wherein the USB data port is electronically coupled to the microprocessor.

19. The digital photo album of claim 1 further comprising a firewire data port coupled to the computer housing, wherein the firewire data port is electronically coupled to the microprocessor.

20. The digital photo album of claim 1 further comprising an infrared data associated port coupled to the frame, wherein the infrared data association port is electronically coupled to the microprocessor.

21. The digital photo album of claim 1 further comprising a power-in port coupled to the computer housing, wherein the power-in port is electronically coupled to the microprocessor.

22. The digital photo album of claim 1 further comprising a battery disposed within the computer housing.

23. The digital photo album of claim 1 further comprises a CD/DVD/RW drive electronically coupled to the microprocessor.

24. A digital photo album for viewing at least one digital image, the digital photo album comprising:
- a frame having a screen configured to display a digital image;
- a scanner housing coupled to the frame, the scanner housing enclosing a scanner configured to scan a photographic print;
- an auto-feed scan mechanism comprising a slot disposed in a lateral surface of the scanner housing, wherein the slot is configured to receive the photographic print; and
- a computer housing enclosing a hard drive, a microprocessor and a memory coupled to the microprocessor.

25. The digital photo album of claim 24 further comprising:
- an optical sensor disposed inside the scanner housing, the optical sensor coupled to the microprocessor;
- a drive motor; and
- at least one pinch roller coupled to the drive motor, the pinch roller configured to pull a photo into the scanner housing when the drive motor is actuated based on a response provided by the optical sensor.

26. The digital photo album of claim 24 wherein the computer housing is configured to serve as a support stand for the frame.

27. The digital photo album of claim 26 wherein the computer housing comprises a first support leg separated a distance apart from a second support leg.

28. The digital photo album of claim 27 further comprising at least one data port disposed between the first support leg and the second support leg, the data port selected from the group consisting of a USB port, a firewire port, and a power-in port.

29. The digital photo album of claim 24 wherein the hard drive is configured to store a digital image associated with the photographic print.

30. The digital photo album of claim 24 wherein the hard drive is configured to store at least one photo album playlist comprising a plurality of digital images.

31. The digital photo album of claim 24 wherein the digital photo album is configured to download data from at least one origin medium.

32. The digital photo album of claim 24 wherein the digital photo album is configured to upload data to at least one destination medium.

33. The digital photo album of claim 24 further comprising a swivel mechanism that couples the computer housing to the scanner housing.

34. The digital photo album of claim 33 wherein the swivel mechanism allows the screen to be transported between a first orientation configured to display a digital image in a landscape configuration and a second orientation configured to display a digital image in a portrait configuration.

35. The digital photo album of claim 24 further comprising a hinge mechanism that couples the computer housing to the scanner housing.

36. The digital photo album of claim 24 further comprising a plurality of control buttons coupled to the frame and electronically coupled to the microprocessor.

37. The digital photo album of claim 24 further comprising a USB data port coupled to the computer housing, wherein the USB data port is electronically coupled to the microprocessor.

38. The digital photo album of claim 24 further comprising a firewire data port coupled to the computer housing, wherein the firewire data port is electronically coupled to the microprocessor.

39. The digital photo album of claim 24 further comprising an infrared data associated port coupled to the frame, wherein the infrared data association port is electronically coupled to the microprocessor.

40. The digital photo album of claim 24 further comprising a power-in port coupled to the computer housing, wherein the power-in port is electronically coupled to the microprocessor.

41. The digital photo album of claim 24 further comprising a battery disposed within the computer housing.

42. The digital photo album of claim 24 further comprises a CD/DVD/RW drive electronically coupled to the microprocessor.

43. A digital photo album for viewing at least one digital image, the digital photo album comprising:
 a frame having a screen configured to display a digital image;
 a computer housing enclosing a hard drive, a microprocessor and a memory coupled to the microprocessor; and
 a scanner housing coupled to the frame, the scanner housing enclosing a scanner configured to scan a photographic print,
 wherein the scanner housing and the frame are configured to be at least partially separated to allow a user to position a photographic print at a location between the frame and the scanner.

44. The digital photo album of claim 43 further comprising a tray having a groove into which the photographic print may be placed.

45. The digital photo album of claim 43 wherein the computer housing is configured to serve as a support stand for the frame.

46. The digital photo album of claim 45 wherein the computer housing comprises a first support leg separated a distance apart from a second support leg.

47. The digital photo album of claim 46 further comprising at least one data port disposed between the first support leg and the second support leg, the data port selected from the group consisting of a USB port, a firewire port, and a power-in port.

48. The digital photo album of claim 43 wherein the hard drive is configured to store a digital image associated with the photographic print.

49. The digital photo album of claim 43 wherein the hard drive is configured to store at least one photo album playlist comprising a plurality of digital images.

50. The digital photo album of claim 43 wherein the digital photo album is configured to download data from at least one origin medium.

51. The digital photo album of claim 43 wherein the digital photo album is configured to upload data to at least one destination medium.

52. The digital photo album of claim 43 further comprising a swivel mechanism that couples the computer housing to the scanner housing.

53. The digital photo album of claim 52 wherein the swivel mechanism allows the screen to be transported between a first orientation configured to display a digital image in a landscape configuration and a second orientation configured to display a digital image in a portrait configuration.

54. The digital photo album of claim 43 further comprising a hinge mechanism that couples the computer housing to the scanner housing.

55. The digital photo album of claim 43 further comprising a plurality of control buttons coupled to the frame and electronically coupled to the microprocessor.

56. The digital photo album of claim 43 further comprising a USB data port coupled to the computer housing, wherein the USB data port is electronically coupled to the microprocessor.

57. The digital photo album of claim 43 further comprising a firewire data port coupled to the computer housing, wherein the firewire data port is electronically coupled to the microprocessor.

58. The digital photo album of claim 43 further comprising an infrared data associated port coupled to the frame, wherein the infrared data association port is electronically coupled to the microprocessor.

59. The digital photo album of claim 43 further comprising a power-in port coupled to the computer housing, wherein the power-in port is electronically coupled to the microprocessor.

60. The digital photo album of claim 43 further comprises a CD/DVD/RW drive electronically coupled to the microprocessor.

61. A method for viewing at least one digital image using a digital photo album, the method comprising;
 providing a digital photo album comprising a frame having a screen, a scanner disposed within a scanner housing, wherein the scanner housing is coupled to the frame, and a computer housing coupled to the scanner housing;
 positioning a photographic print in a position facing the scanner;
 scanning the photographic print;
 displaying a digital image associated with the photographic print on the screen;
 saving the digital image; and
 subsequently viewing the digital image on the screen,
 wherein positioning a photographic print in a position facing a scanner further comprises:
 providing an auto-feed scan mechanism comprising a slot disposed in a lateral surface of the scanner housing; and
 automatically pulling the photographic print into the slot.

62. The method of claim 61 wherein automatically pulling the photographic print into the slot further comprises:
 sensing a leading edge of the photographic print;
 actuating a drive motor coupled to at least one pinch roller; and
 causing the pinch roller to pull the photographic print into a position facing the scanner.

63. A method for viewing at least one digital image using a digital photo album, the method comprising;
 providing a digital photo album comprising a frame having a screen, a scanner disposed within a scanner housing, wherein the scanner housing is coupled to the frame, and a computer housing coupled to the scanner housing;

positioning a photographic print in a position facing the scanner;

scanning the photographic print;

displaying a digital image associated with the photographic print on the screen;

saving the digital image; and subsequently viewing the digital image on the screen, wherein positioning a photographic print in a position facing a scanner further comprises:

at least partially separating an upper portion of the scanner housing from an upper portion of the frame; and manually inserting the photographic print to a position facing the scanner.

64. The method of claim 61 or 63 further comprising the step of editing the digital image prior to the step of saving the digital image.

65. The method of claim 61 or 63 further comprising the step of editing the digital image after the step of saving the digital image.

66. The method of claim 61 or 63 wherein saving the digital image further comprises selecting an image format.

67. The method of claim 61 or 63 wherein saving the digital image further comprises selecting an image destination.

68. The method of claim 67 wherein selecting an image destination further comprises saving the digital image to at least one internal destination of the digital photo album.

69. The method of claim 68 wherein the internal destination is a hard drive.

70. The method of claim 68 wherein the internal destination is a CD/DVD/RW drive.

71. The method of claim 67 wherein selecting an image destination further comprises saving the digital image to at least one external destination.

72. The method of claim 71 wherein the external destination is a computer.

73. The method of claim 71 wherein the external destination is an internet storage site.

74. The method of claim 61 or 63 wherein saving the digital image further comprises entering identification information associated with the digital image.

75. The method of claim 61 or 63 further comprising adding the digital image to a photo album playlist, the photo album playlist comprising a plurality of digital images.

76. The method of claim 75 further comprising saving the photo album playlist to a desired medium.

77. The method of claim 76 further comprising playing a slideshow associated with the photo album playlist on the screen of the digital photo album.

78. The method of claim 77 further comprising actuating control buttons coupled to the frame to control a manner in which the slideshow is played.

79. The method of claim 61 or 63 further comprising uploading digital images to the digital photo album from at least one origin medium.

80. A digital photo album for viewing at least one digital image, the digital photo album comprising:

a frame having a screen configured to display a digital image;

a scanner disposed within the frame, the scanner configured to scan at least one photographic print; and a computer housing enclosing a hard drive, a microprocessor and a memory coupled to the microprocessor.

81. The digital photo album of claim 80 wherein the hard drive is configured to store a digital image associated with the photographic print.

82. The digital photo album of claim 80 wherein the hard drive is configured to store at least one photo album playlist comprising a plurality of digital images.

83. The digital photo album of claim 80 wherein the digital photo album is configured to download data from at least one origin medium.

84. The digital photo album of claim 80 wherein the digital photo album is configured to upload data to at least one destination medium.

85. The digital photo album of claim 80 further comprising an auto-feed scan mechanism, the auto-feed scan mechanism comprising a slot disposed in a lateral surface of the frame, wherein the slot is configured to receive a photographic print.

86. The digital photo album of claim 85 further comprising:

an optical sensor disposed inside the frame, the optical sensor coupled to the microprocessor;

a drive motor; and at least one pinch roller coupled to the drive motor, the pinch roller configured to pull a photographic print into the frame when the drive motor is actuated based on a response provided by the optical sensor.

87. The digital photo album of claim 80 further comprising a keyboard electronically coupled to the microprocessor.

88. The digital photo album of claim 80 further comprising at least one storage drive.

89. The digital photo album of claim 80 further comprising a hinge mechanism disposed between the frame and the computer housing, the hinge mechanism configured to transition the digital photo album between an open state and a closed state.

90. The digital photo album of claim 89 further comprising a latch mechanism configured to secure the frame to the computer housing in the closed state.

* * * * *